June 23, 1959 J. H. TAYLOR 2,891,784
PRESSURE REGULATOR WITH ASSOCIATED RELIEF VALVE
Filed Sept. 10, 1956
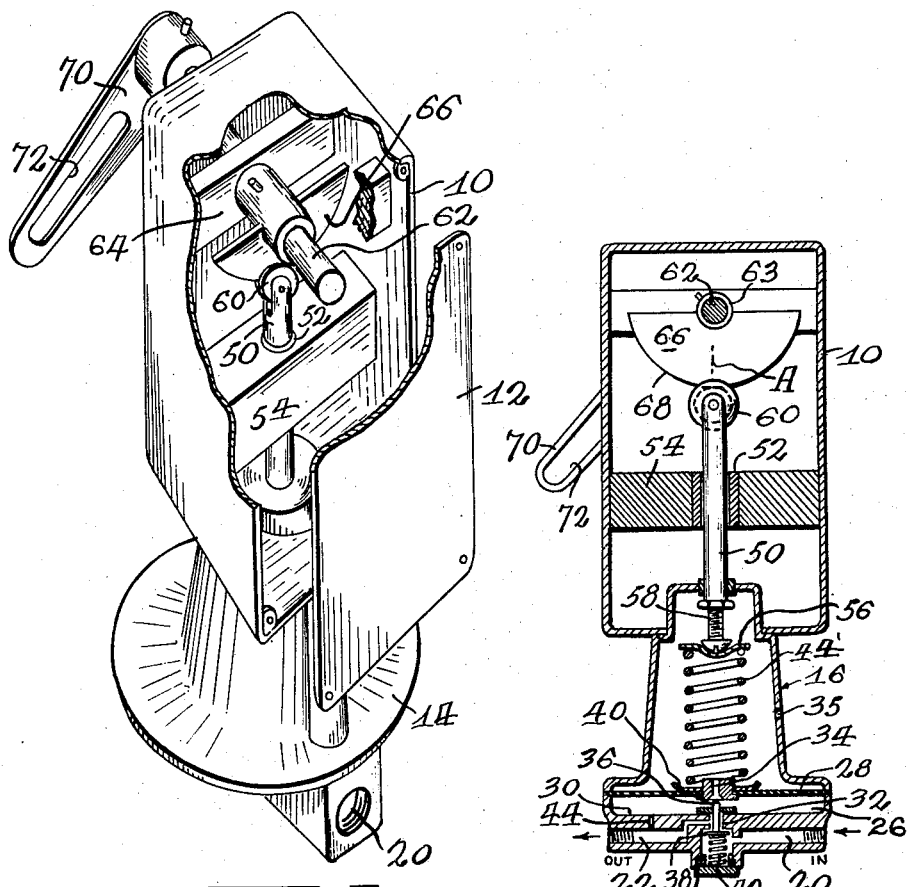
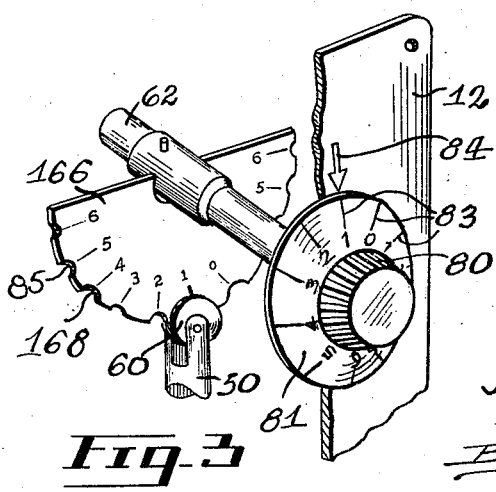
Inventor
JOHN H. TAYLOR
By
Attorney

United States Patent Office 2,891,784
Patented June 23, 1959

2,891,784

PRESSURE REGULATOR WITH ASSOCIATED RELIEF VALVE

John H. Taylor, Lachine, Quebec, Canada, assignor to Ross Engineering of Canada Limited, Montreal, Quebec, Canada Application September 10, 1956, Serial No. 608,736

3 Claims. (Cl. 267—1)

The present invention relates to improvements in pressure controlling apparatus and more specifically to constant pressure regulators for the control of air under pressure in a pressurized circuit.

While there are many and varied types of pressure regulator apparatus available for the controlling of the pressure of gases in a pressurized circuit, most of these, in order to achieve the required results, are complicated in structure and by reason of their complicated structure are of considerable bulk. Further, some of these prior art regulators embody the use of electrical means as a controlling factor, for example solenoids or the like, which operate valves or flow distributors in order to maintain a constant demand pressure or to vary the pressure delivered in the circuit as required by operating demands. As will be appreciated, these expedients necessitate fairly high manufacturing costs and in many cases the pressure regulator apparatus must be "tailor made" to suit a particular installation.

The present invention aims to provide a simple, effective, mechanically operated, constant pressure regulator which is designed with a minimum of parts so as to be considerably less complicated and bulky than the known prior art devices of this nature and which is adaptable to incorporation in any pressurized circuit where controlled, varying or constant pressure is required.

Broadly, the invention provides means whereby the spring loading applied to the balancing diaphragm of a fluid pressure reducing valve is adjusted in equal increments corresponding to a mechanical movement applied thereto.

More specifically, the present construction includes in combination with a reducing valve of the diaphragm type having a spring biased flexible controlling diaphragm, a diaphragm spring controlling and adjusting mechanism comprising a sliding rod which is mounted above and in axial alignment with the diaphragm spring with one end in engagement with the spring; a cam plate having an arcuate cam surface in contact with the other end of the sliding rod is mounted above the sliding rod on a supporting shaft and a lever arm is connected to the one end of the cam supporting shaft. With this arrangement, movement of the lever arm is transmitted by the cam plate surface to the sliding rod and through the sliding rod to the reducing valve diaphragm regulating spring.

In order that movements of the lever arm are transmitted in equal increments to the sliding rod the cam surface of the plate is preferably shaped to follow an arc symmetrical from each side of a central axis and the sliding rod end is aligned with the cam plate central axis. Preferably the end of the sliding rod contacted by the cam surface is provided with a rotatably mounted cam plate guide wheel or pulley to reduce friction. By providing the actuating lever arm with a means for adjustable connection to any desired controlling arrangement, for example by providing the lever with an elongated slot, the extent of movement of the arm and consequently the proportionate degree of pressure control imparted by the cam surface can be regulated as desired.

As an alternative structure the lever arm can be replaced by a suitably marked indicator wheel or dial and the cam surface correspondingly notched or indented so that the pressure valve can be manually set to any predetermined position of constant pressure required.

Having thus generally described the nature of the invention, particular reference will be made to the accompanying drawings wherein there is shown by way of illustration, preferred embodiments of constant pressure regulators in accordance with the invention, and in which:

Figure 1 is a view in perspective elevation and partially in section with a portion of the upper housing broken away to show the internal arrangement more clearly.

Figure 2 is a cross-sectional view of the construction shown in Figure 1.

Figure 3 is a diagrammatic view of an alternative arrangement of cam and cam operating shaft with suitable indentations and correspondingly designated manual control wheel.

With reference to the accompanying drawings, the pressure regulator arrangement shown is constructed as a unit having an upper housing portion 10 having a removable front panel 12 and a lower housing portion 14 housing a reducing valve assembly 16.

The reducing valve assembly is of the diaphragm balanced type having inlet and outlet passages 20, 22, leading into and through a valve chamber 24. A diaphragm chamber 26 is provided in the upper portion of the housing 14 and a flexible diaphragm 28 forms the top wall of said chamber. A non-flexible partition or wall 30 forms the bottom of the diaphragm chamber and a valve orifice and seat 32 is provided in the wall 30 and extends into the valve chamber 24 in axial alignment with a corresponding orifice and seat 34 provided in the flexible diaphragm 16. A double poppet valve 36 is mounted in the lower valve seat 32 and is provided with a flanged head 38 at one end adapted to close off the seat 32 and on the other end with a rounded head 40 adapted to close off the diaphragm valve seat 34. A spring 42 mounted in the valve chamber 24 normally and resiliently urges the valve closure heads 38, 40 upwards towards seating condition. An exhaust port 35 is provided in the side wall of the lower housing portion 14.

The combined inlet and outlet passages 20, 22, are adapted to lead gases through the lower valve seat 30 exteriorly of the diaphragm chamber 26 and a balancing orifice 44 is provided in the lower wall 30 of the diaphragm chamber. A coil spring 44 acts against the diaphragm 28 as is well known.

In accordance with the present invention the upper housing portion 10 is mounted directly over this reducing valve assembly and a plunger rod 50 is slidably mounted in bearings 52 extending through a supporting block 54 so as to be in axial alignment with the coil spring 44. A cap or socket 56 is mounted on the upper end of the spring 44 and an adjustable screw 58 mounted in the lower end of the rod 50 engages in this socket. A guide wheel or roller 60 is mounted for rotation on the other end of the rod 50. A shaft 62 is mounted in bearings 63 for rotation within a supporting block 64 extending across the upper housing portion 10. The shaft 62 is disposed transverse to and in axial alignment with the plunger rod 50 and a cam plate 66 mounted on the shaft 62 is provided with a cam surface 68 engaged with and riding on the roller 60 mounted on the rod 50. A lever arm 70 having an elongated attachment slot 72 is mounted on the end of the shaft 62 extending beyond the casing 10.

The preferred contour of the cam surface 68 is symmetrically arcuate from a diametric center line "A" so that rotation of the cam plate 66 is either direction relative to the center line "A" acts to progressively depress the plunger rod 50 in even graduated increments corresponding proportionately to a mechanical movement imparted to the lever arm 70. The loading on the spring 44 of the reducing valve diaphragm 28 is therefore adjusted accordingly.

The poppet valve 36 is normally urged by the spring 42 upwards into closed position and the diaphragm spring 44 set by adjustment of the screw 58 of the rod 50 with the cam in dead center position so that the valve is normally closed in the dead center position of the cam and then by regulating movement of the cam and consequently the loading of spring 44 the valve can be opened up to give any desired increase in pressure, for example, from "0" to 30 lbs. Alternatively, the diaphragm spring can be loaded so that the starting position of the cam can be normal at a predetermined pressure, for example 10 lbs. p.s.i. and can be varied by the movement of the cam plate in even increments, say up to 50 lbs. p.s.i.

As will be appreciated by reference to the preceding description and accompanying drawing, the present invention in combination with a reducing valve provides a simple versatile constant pressure regulator which can be utilized in many and varied pressurized installations. For example, it can be used as a controlling element in combination with a pneumatic motor, a pneumatic sensing valve, or as a weight responsive element in an integrating system. A simple mechanical linkage from any desired controlling point to the lever arm 70 transmits in even increments any mechanical movement into corresponding even variations in pressure on a pressurized gas delivered through the reducing valve assembly 16 by adjusting the loading of the valve diaphragm spring.

Further, and with reference to Figure 3, as an alternative form, the lever arm 70 is replaced by a hand wheel 80 having a dial plate 81 and a cam plate 166 having a regularly notched or indented cam surface 168 is used in place of the regularly contoured cam plate 66. The hand wheel dial 81 bears suitable radially disposed indicia 83 corresponding to the notches 85 on the cam plate 166 so that by alignment with an indicator 84 provided on the front panel 12 of the housing 10 the reducing valve assembly can be manually set to any desired predetermined position corresponding to desired constant pressures.

It will be appreciated that the cam surfaces of the cam plates 66, 166 can be contoured to give any desired constant ratio of increased pressure proportionate to the movement of the lever arm 70 or the hand wheel 80.

The present arrangement can be easily adapted for use in the controlling of hydraulic fluid in a pressurized system by a slight modification to the construction illustrated. For example, by the addition of a hydraulic seal where the rod 50 enters the housing 14, and a hydraulic return line from the exhaust port 35 leading to a hydraulic fluid reservoir.

I claim:

1. In a fluid pressure reducing valve embodying a spring urged diaphragm mounted in a first housing and a diaphragm spring mounted axially of said housing with one end engaging said diaphragm, spring adjustment means comprising a second housing mounted on said first housing, a symmetrical cam plate mounted for rotation within said second housing about a shaft disposed transversely to the axis of said diaphragm spring, a rod mounted for sliding axial movement within said second housing and having one end extending through said first housing into contact with the other end of said diaphragm spring, roller means on the other end of said rod in resilient bearing engagement with the contoured surface of said cam plate, said cam plate contoured surface following a symmetrical arc from each side of a central axis normally disposed in axial alignment with said diaphragm spring and sliding rod and said sliding rod end is aligned with said cam plate central axis in starting position, said cam surface being shaped to impart successive equal increments of spring effecting travel to said rod for proportional successive equal degrees of cam rotation in either direction from said starting position, and a shaft rotating member mounted on said cam supporting shaft exteriorly of said second housing.

2. Spring adjustment means, as claimed in claim 1, wherein said shaft rotating member comprises a lever arm having one end connected to said cam plate supporting shaft.

3. In a fluid pressure reducing valve embodying a spring urged diaphragm mounted in a first housing and a diaphragm spring mounted axially of said housing with one end engaging said diaphragm, spring adjustment means comprising a second housing mounted on said first housing, a symmetrical cam plate mounted for rotation within said second housing about a shaft disposed transversely to the axis of said diaphragm spring, a rod mounted for sliding axial movement within said second housing and having one end extending through said first housing into contact with the other end of said diaphragm spring, roller means on the other end of said rod in resilient bearing engagement with the contoured surface of said cam plate, and a hand wheel axially mounted on said cam plate supporting shaft, said hand wheel including a dial bearing circumferentially spaced apart indicating indicia and said cam plate surface follows a symmertical arc from each side of a diametric center line and is notched at circumferentially spaced apart intervals proportionately corresponding to said hand wheel dial indicia.

References Cited in the file of this patent

UNITED STATES PATENTS

| 891,340 | Huff | June 23, 1908 |
| 1,993,639 | Wiswell | Mar. 5, 1935 |
| 2,720,887 | Safford | Oct. 18, 1955 |
| 2,735,669 | Seiler | Feb. 21, 1956 |

FOREIGN PATENTS

| 322,155 | Great Britain | Nov. 28, 1929 |